United States Patent
Vu et al.

(10) Patent No.: US 12,049,402 B2
(45) Date of Patent: *Jul. 30, 2024

(54) METHOD FOR THE MANUFACTURE OF GRAPHENE OXIDE FROM ELECTRODE GRAPHITE SCRAP

(71) Applicant: ArcelorMittal, Luxembourg (LU)

(72) Inventors: Thi Tan Vu, Oviedo (ES); Abel Alvarez-Alvarez, Asturias (ES); Roberto Suarez Sanchez, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 825 days.

This patent is subject to a terminal disclaimer.

(21) Appl. No.: 17/055,744

(22) PCT Filed: Apr. 10, 2019

(86) PCT No.: PCT/IB2019/052936
§ 371 (c)(1),
(2) Date: Nov. 16, 2020

(87) PCT Pub. No.: WO2019/224619
PCT Pub. Date: Nov. 28, 2019

(65) Prior Publication Data
US 2021/0206646 A1 Jul. 8, 2021

(30) Foreign Application Priority Data

May 23, 2018 (WO) .................. PCT/IB2018/053642

(51) Int. Cl.
*C01B 32/198* (2017.01)
*C01B 32/192* (2017.01)
*C01B 32/23* (2017.01)

(52) U.S. Cl.
CPC .......... *C01B 32/198* (2017.08); *C01B 32/192* (2017.08); *C01B 32/23* (2017.08); *C01P 2004/61* (2013.01); *C01P 2006/40* (2013.01)

(58) Field of Classification Search
CPC .................................................. C01B 32/198
See application file for complete search history.

(56) References Cited

U.S. PATENT DOCUMENTS

| | | | |
|---|---|---|---|
| 4,075,114 A | 2/1978 | Ishikawa et al. | |
| 5,330,680 A | 7/1994 | Sakawaki et al. | |
| 11,390,529 B2 | 7/2022 | Vu et al. | |
| 11,702,341 B2 * | 7/2023 | Vu | C01B 32/194 |
| | | | 423/415.1 |
| 2010/0055458 A1 | 3/2010 | Jang et al. | |
| 2011/0280787 A1 | 11/2011 | Chen et al. | |
| 2013/0197256 A1 | 8/2013 | Wu et al. | |
| 2014/0154164 A1 | 6/2014 | Chen et al. | |
| 2014/0242275 A1 | 8/2014 | Zhamu et al. | |
| 2014/0248214 A1 | 9/2014 | Hersam et al. | |
| 2015/0093324 A1 | 4/2015 | Thevasaharam | |
| 2015/0158729 A1 | 6/2015 | Wu et al. | |
| 2016/0096735 A1 | 4/2016 | Savsunenko et al. | |
| 2016/0228846 A1 | 8/2016 | Chen et al. | |
| 2016/0236939 A1 | 8/2016 | De Miguel et al. | |
| 2016/0272499 A1 | 9/2016 | Zurutuza | |
| 2016/0347619 A1 | 12/2016 | Chang et al. | |
| 2017/0049814 A1 | 2/2017 | Sawosz et al. | |
| 2018/0072573 A1 | 3/2018 | Chaki et al. | |
| 2018/0339906 A1 | 11/2018 | Lu et al. | |
| 2021/0206646 A1 | 7/2021 | Vu et al. | |

FOREIGN PATENT DOCUMENTS

| | | |
|---|---|---|
| CN | 102198938 A | 9/2011 |
| CN | 102431998 | 5/2012 |
| CN | 103738955 A | 4/2014 |
| CN | 103879990 A | 6/2014 |
| CN | 103910354 A | 7/2014 |
| CN | 104817070 A | 8/2015 |
| CN | 105084344 A | 11/2015 |
| CN | 105293476 A | 2/2016 |
| CN | 105948033 A | 9/2016 |
| CN | 106145101 A | 11/2016 |
| CN | 107572511 A | 1/2018 |
| CN | 107673338 | 2/2018 |
| CN | 104059618 B | 4/2018 |
| CN | 104059618 B | 4/2018 |
| CN | 112135793 B | 2/2024 |
| JP | S4999986 A | 9/1974 |
| JP | S49112898 A | 10/1974 |
| JP | S51109914 A | 9/1976 |
| JP | S5344917 B2 | 12/1978 |
| JP | S6369705 A | 3/1988 |
| JP | H02153810 A | 6/1990 |
| JP | H0647315 A | 2/1994 |

(Continued)

OTHER PUBLICATIONS

International Search Report of PCT/IB2019/052936, Jul. 24, 2019.
Jung-Chul An et al, "Preparation of Kish graphite-based graphene nanoplatelets by GIC (graphite intercalation compound) via process", Journal of Industrial and Engineering Chemistry, Korea, (Jun. 1, 2015), vol. 26, ISSN 1226-086X, pp. 55-60.
Z-S Wu et al, "Synthesis of high-quality graphene with a predetermined number of layers", Carbon,, (Nov. 5, 2008), vol. 47, pp. 493-499.

(Continued)

*Primary Examiner* — Stuart L Hendrickson

(74) *Attorney, Agent, or Firm* — Davidson Kappel LLC

(57) ABSTRACT

A method for the manufacture of graphene oxide from electrode graphite scrap including the provision of electrode graphite scrap, the grinding of electrode graphite scrap to obtain ground graphite electrode and an oxidation step of the ground graphite electrode to obtain graphene oxide.

15 Claims, 1 Drawing Sheet

(56) References Cited

FOREIGN PATENT DOCUMENTS

| | | |
|---|---|---|
| JP | H1017313 A | 1/1998 |
| JP | 2012131691 A | 7/2012 |
| JP | 2012515705 A | 7/2012 |
| JP | 2013212975 A | 10/2013 |
| JP | 2014001126 A | 1/2014 |
| JP | 2016190781 A | 11/2016 |
| JP | 2016534958 A | 11/2016 |
| KR | 101109961 | 2/2012 |
| KR | 20160082721 A | 7/2016 |
| WO | WO2017027731 A1 | 2/2017 |
| WO | WO2017048027 A1 | 3/2017 |
| WO | WO2018178842 | 10/2018 |
| WO | WO2018178845 | 10/2018 |
| WO | WO2019/220226 A1 | 11/2019 |
| WO | WO2019/220227 A1 | 11/2019 |
| WO | WO2019/220228 A1 | 11/2019 |
| WO | WO2019/224620 A1 | 11/2019 |
| WO | WO2019224619 A1 | 11/2019 |

OTHER PUBLICATIONS

L. Stobinski et al, "Graphene oxide and reduced graphene oxide studied by the XRD, TEM and electron spectroscopy methods", Journal of Electron Spectroscopy and Related Phenomena., NL, (Aug. 1, 2014), vol. 195, ISSN 0368-2048, pp. 145-154.

Morimoto et al.: "Tailoring the oxygen content of graphite and reduced graphene oxide for specific applications", Scientific Reports, vol. 6, No. 1, Feb. 25, 2016.

Jinguao Song et al.: "Preparation and Characterization of Graphene Oxide", Journal of nanomaterials, vol. 2014, Jan. 1, 2014, pp. 1-6.

Munuera, J. M., et al. "High quality, low oxygen content and biocompatible graphene nanosheets obtained by anodic exfoliation of different graphite types." Carbon 94 (2015): 729-739.

Zhang, Ming, et al. "Production of graphene sheets by direct dispersion with aromatic healing agents." Small 6.10 (2010): 1100-1107.

Javad Rafiee: "Wetting transparency of graphene", Nature Materials, Mar. 1, 2012 Nature Publishing Group UK, London, vol. 11, Nr: 3, pp. 217-222.

Ranjbarzadeh Ramin et al:"Empirical analysis of heat transfer and friction factor of water/graphene oxide nanofluid flow in turbulent regime through an isothermal pipe"; Applied Thermal Engineering, Jul. 27, 2017 Pergamon, Oxford, GB vol. 126, pp. 538-554.

Park et al.: "Effects of nanofluids containing graphene/graphene-oxide nanosheets on critical heat flux"; Applied Physics Letters, Jul. 12, 2010 American Institute of Physics, 2 Huntington Quadrangle, Melville, NY 11747; vol. 97, Nr: 2, p. 23103.

Morimoto: "Tailoring the Oxygen Content of Graphite and Reduced Graphene Oxide for Specific Applications"; Scientific Reports, Apr. 1, 2016; vol. 6, Nr: 1.

Qing-Qiang Kong, Cheng-Meng Chen, Qiang Zhang, Xing-Hua Zhang, Mao-Zhang Wang, and Rong Cai: "Small Particles of Chemically-Reduced Graphene with Improved Electrochemical Capacity "*The Journal of Physical Chemistry C* 2013 117 (30), 15496-15504. DOI: 10.1021/jp403497u.

Chelgani, et al., A Review of Graphite Beneficiation Techniques, Mineral Processing And Extractive Metallurgy Review 2016; 37(1): 58-68 (Year: 2016).

Flores-Velez, et al., Graphene Oxide / Multilayer-Graphene Synthesized from Electrochemically Exfoliated Graphite and Its Influence on Mechanical Behavior of Polyurethane Composites, Materials Science and Applications 2018; 9: 565-575 (Year: 2018).

Ching-Yuan Su et al., "Electrical and Spectroscopic Characterizations of Ultra-Large Reduced Graphene Oxide Monolayers", Chemistry of materials, US, (Dec. 8, 2009), vol. 21, No. 23, doi:10.1021/cm902182y, ISSN 0897-4756, pp. 5674-5680, XP055557729.

Han Seo et al., "Pool boiling CHF of reduced graphene oxide, graphene, and SiC-coated surfaces under highly wettable FC-72", International Journal of Heat and Mass Transfer, Amsterdam, NL, (Mar. 1, 2015), vol. 82, doi:10.1016/j.ijheatmasstransfer.2014.11.019, ISSN 0017-9310, pp. 490-502, XP055557726.

\* cited by examiner

METHOD FOR THE MANUFACTURE OF GRAPHENE OXIDE FROM ELECTRODE GRAPHITE SCRAP

The present invention relates to a method for the manufacture of graphene oxide from electrode graphite scrap. In particular, graphene oxide will have applications in metal industries including steel, aluminum, stainless steel, copper, iron, copper alloys, titanium, cobalt, metal composite, nickel industries, for example as coating or as a cooling reagent.

BACKGROUND

Graphite electrode scrap is a residue in the steelmaking process. Indeed, Graphite electrodes scrap are used in electric arc furnaces (EAF). EAF is a furnace comprising the graphite electrodes that heats charged material, i.e. scraps, by means of an electric arc. After charging the EAF with scraps, the electrodes are lowered onto the scrap, an arc is struck and the electrodes are then set to bore into the layer of shred at the top of the furnace. Once the electrodes have reached the heavy melt at the base of the furnace and the arcs are shielded by the scrap, the voltage can be increased and the electrodes raised slightly, lengthening the arcs and increasing power to the melt.

The electrodes can be used several times but their life time is short. Usually, waste graphite electrodes scrap are open-air stored.

It is known to use the waste graphite electrodes are used to synthesize Graphene. Graphene is a single layer of Graphite consisting of carbons that are bonded together in a hexagonal honeycomb lattice. In other terms, it is an allotrope of carbon in the structure of a plane of $sp^2$ bonded atoms.

The patent CN107673338 discloses a mechanical Exfoliation process. In this patent, the method for preparing graphene using a waste graphite electrode comprises following steps:
 step 1: pretreatment, purification and liquid phase stripping strengthening of the waste graphite electrode:
 step 2: centrifugal classification and
 step 3: post treatment.

However, the method for the manufacture of graphene comprises a multitude of steps. In particular, the pretreatment, purification and liquid phase stripping strengthening of the waste graphite electrode (step 1) includes a multitude of sub-steps extending significantly the method duration. Indeed, the method pulverizing the surface layer into graphite powder with a particle size of 20 μm to 60 μm, and placing the graphite powder in a liquid phase purification stripping solution containing an aluminum ion salt formulated and added in a mass ratio of aluminum element to graphite powder of 1:10 to 1:50 to perform purification and stripping strengthening treatment, controlling the pH of the liquid phase purification stripping solution at 0.5 to 2 during the treatment process, after finishing the treatment, allowing the solution to stand and stratify, resulting in the upper layer which is a graphene-containing cloudy solution and the lower layer which is coarse graphite and insoluble impurity particles, and separating the upper layer and the lower layer to obtain the graphene-containing cloudy solution ready for use; to prepare graphene. Then, a centrifugation is performed. Finally, an intercalation step is performed using sodium, aluminum and fluorine as an intercalation reagent to intercalate the graphite. Thus, Graphite can be exfoliated to obtain graphene. This method, especially the pretreatment, purification and liquid phase stripping strengthening step, is very difficult to handle at industrial scale. Moreover, by applying this method, it is only possible to obtain graphene, no other materials such as graphene oxide since these compounds are completely different. The methods for producing graphene cannot be transposed to the method for manufacturing graphene oxide.

Graphene oxide is composed of one or few layers of graphene sheets containing oxygen functional groups. Thanks to its interesting properties such as a high thermal conductivity and a high electrical conductivity, graphene oxide has many applications as mentioned above. Moreover, the presence of oxygen functional groups make it hydrophilic and therefore it can be easily dispersed in water.

It is known to produce graphene oxide from Kish graphite. Kish graphite comprises a high amount of carbon, usually above 50% by weight, it is a good candidate to produce graphene based materials.

The patent KR101109961 discloses a method of manufacturing graphene oxide, comprising:
 a step of pretreating Kish graphite,
 a step of manufacturing graphite oxide by oxidizing the pretreated Kish graphite with an acid solution;
 a step of manufacturing graphene oxide by exfoliating the graphite oxide and
 a step of manufacturing reduced graphene oxide by reducing the graphene oxide with a reducing agent.

In this Korean patent, the pre-treatment of Kish graphite comprises: a flushing process, a process of purification using a chemical pretreatment composition and a mechanical separation process (separation by size). After the process of purification, the purified Kish graphite is separated by size, the Kish graphite having a particle size of 40 mesh or less, i.e. 420 μm or less, is kept for the manufacture of graphene oxide.

However, the pretreatment of Kish graphite comprises 2 steps using a chemical composition: the flushing step and the process of purification step. In the Example of KR101109961, the flushing step is performed with an aqueous solution comprising water, hydrochloric acid and nitric acid. Then, the process of purification is performed with a pretreatment composition comprising a chelating agent, an iron oxide remover, a surfactant, an anionic and nonionic polymer dispersant and distilled water. At industrial scale, two chemical treatments are difficult to manage since a lot of chemical waste has to be treated and the stability of such composition is difficult to control.

SUMMARY OF THE INVENTION

Moreover, the pretreatment composition of the KR101109961 reference needs a long time preparation. The productivity is therefore slowed. Additionally, the pre-treatment of Kish graphite including the process of purification using the pretreatment composition is not environmentally friendly.

Thus, there is a need to produce graphene oxide by an environmentally friendly method in a short time to increase the productivity compared to conventional methods.

It is an object of the present invention to provide a less polluting method for the manufacture of graphene oxide compared to the conventional methods. Additionally, it is an object to provide an industrial method to obtain graphene oxide having good quality in the shortest time possible.

The present invention provides a method for the manufacture of graphene oxide from graphite electrode scrap comprising:
A. the provision of the graphite electrode scrap,
B. the grinding of electrode graphite scrap to obtain ground graphite electrode,
C. an oxidation step of the ground graphite electrode to obtain graphene oxide comprising the following successive sub-steps:
  i. the preparation of a mixture comprising the ground graphite electrode, an acid and a nitrate salt, the mixture being kept at a temperature below 5° C.,
  ii. the addition of an oxidizing agent into the mixture obtained in step C.i) to obtain graphite oxide,
  iii. after the targeted level of oxidation is reached, the addition of a chemical element to stop the oxidation reaction,
  iv. the separation of graphite oxide from the mixture obtained in step C.iii),
  v. the exfoliation of graphite oxide into graphene oxide.

The following terms are defined:
graphene oxide means one or a few layer(s) of graphene comprising at least 25% by weight of oxygen functional groups and
oxygen functional groups means ketone groups, carboxyl groups, epoxy groups and hydroxyl groups. Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
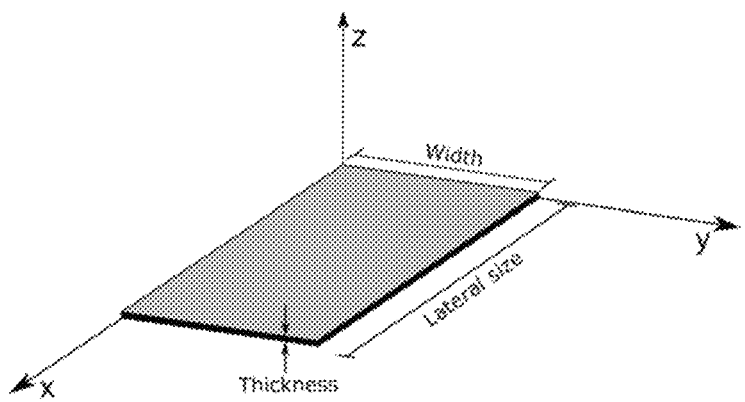
FIG. 1 illustrates an example of one layer of graphene oxide according to the present invention.

The present invention relates to a method for the manufacture of graphene oxide from graphite electrode scrap comprising:
A. the provision of the graphite electrode scrap,
B. the grinding of electrode graphite scrap to obtain ground graphite electrode,
C. an oxidation step of the ground graphite electrode to obtain graphene oxide comprising the following successive sub-steps:
  i. the preparation of a mixture comprising the ground graphite electrode, an acid and a nitrate salt, the mixture being kept at a temperature below 5° C.,
  ii. the addition of an oxidizing agent into the mixture obtained in step C.i) to obtain graphite oxide,
  iii. after the targeted level of oxidation is reached, the addition of a chemical element to stop the oxidation reaction,
  iv. the separation of graphite oxide from the mixture obtained in step C.iii) and
  v. the exfoliation of graphite oxide into graphene oxide.

Without willing to be bound by any theory, it seems that with the method according to the present invention, it is possible to produce graphene oxide from graphite electrode scrap without a long time preparation step of the graphite electrode. Indeed, the grinding (step B) followed by the chemical oxidation of the electrode allows for a more environmentally friendly method compared to the method of the prior art in a short time increasing the productivity of graphene oxide.

Preferably, in step B), the grinding is performed to obtain ground graphite electrode having a size less than 200 μm, more preferably less than 150 μm and advantageously between 100 and 150 μm. Without willing to be bound by any theory, it is believed that when the ground graphite electrode has the above size, the method productivity is further improved since the ground graphite electrode is completely oxidize in a shorter time. Indeed, it seems that the ground graphite electrode size can also have an impact on the method productivity, especially on the oxidation time, because the oxidizing agent can easily navigate between the graphite having the above size. So to obtain graphene oxide having a high oxygen percentage, there is a risk to increase the oxidation time when the electrode graphite size is outside the above range.

Preferably, in step C.i), the salt nitrate is chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof. More preferably, the salt nitrate is chosen from $NaNO_3$ and $NH_4NO_3$.

Advantageously, in step C.i), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof.

Preferably in step C.ii), the oxidizing agent is chosen from: potassium permanganate ($KMnO_4$), $H_2O_2$, $O_3$, $H_2S_2O_8$, $H_2SO_5$, $KNO_3$, NaClO or a mixture thereof. In a preferred embodiment, the oxidizing agent is potassium permanganate.

Preferably, the reaction is realized at a temperature below 50° C. or at room temperature.

Then, in step C.iii), when the targeted level of oxidation is reached, a chemical element is added to stop the oxidation. The targeted level of oxidation depends on the oxidation degree of graphene oxide, i.e. having at least 45% by weight of oxygen groups according to the present invention. The level of oxidation of graphene oxide can be analyzed by scanning electron microscopy (SEM), X ray diffraction spectroscopy (XRD), Transmission electron microscopy (TEM), LECO analysis and/or Raman spectroscopy over time during the oxidation.

Then, advantageously in step C.iii), the chemical element used to stop the oxidation reaction is chosen from: an acid, non-deionized water, deionized water, $H_2O_2$ or a mixture thereof.

In a preferred embodiment, when at least two elements are used to stop the reaction, they are used successively or simultaneously. Preferably, deionized water is used to stop the reaction and then $H_2O_2$ is used to eliminate the rest of the oxidizing agent. In another preferred embodiment, $H_2O_2$ is used to stop the reaction and eliminate the rest of the oxidizing agent. In another preferred embodiment, $H_2O_2$ is used to stop the reaction by this following reaction:

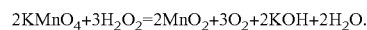
$$2KMnO_4 + 3H_2O_2 = 2MnO_2 + 3O_2 + 2KOH + 2H_2O.$$

Then, to eliminate $MnO_2$, an acid can be used. For example, HCl is added to the mixture so that the following reaction happens:

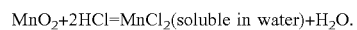
$$MnO_2 + 2HCl = MnCl_2(\text{soluble in water}) + H_2O.$$

Without willing to be bound by any theory, it seems that when the element to stop the reaction is added into the mixture, there is a risk that this addition is too exothermic resulting in explosion or splashing. Thus, preferably in step C.iii), the element used to stop the reaction is slowly added into the mixture obtained in step C.ii). More preferably, the mixture obtained in step C.ii) is gradually pumped into the element used to stop the oxidation reaction. For example, the mixture obtained in step C.ii) is gradually pumped into deionized water to stop the reaction.

Optionally in step C.iv), graphite oxide is separated from the mixture obtained in step C.iii). Preferably, the graphite oxide is separated by centrifugation, by decantation or filtration.

Preferably, in step C.v), the exfoliation is performed by using ultrasound, by mechanical agitator, by sieve shaker or thermal exfoliation. Preferably, the mixture obtained in step C.iii) is exfoliated by using ultrasound into one or a few layers of graphene oxide. Preferably, the lateral size of the graphene oxide is below 20 μm, preferably below 15 μm.

The obtained graphene oxide has good quality since it is produced from ground graphite electrode scrap. The percentage of oxygen functionalities is high. Thus, the graphene oxide is easy dispersible in water and other organic solvents.

By applying the method according to the present invention, Graphene oxide comprising at least 25% by weight of oxygen functional groups and having an average lateral size between up to 30 μm comprising at least one layer sheet is obtained.

FIG. 1 illustrates an example of one layer of graphene oxide according to the present invention. The lateral size means the highest length of the layer through the X axis, the thickness means the height of the layer through the Z axis and the width of the nanoplatelet is illustrated through the Y axis.

Figure 2:
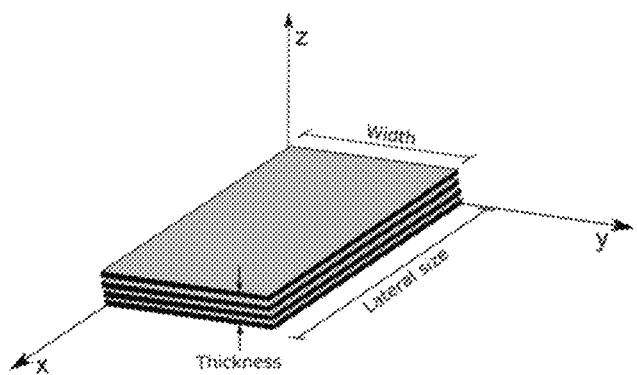
FIG. 2 illustrates an example of a few layers of graphene oxide according to the present invention.

FIG. 2 illustrates an example of a few layers of graphene oxide according to the present invention. The lateral size means the highest length of the layer through the X axis, the thickness means the height of the layer through the Z axis and the width of the nanoplatelet is illustrated through the Y axis.

Preferably, graphene oxide is deposited on metallic substrate steel to improve some properties such as corrosion resistance of a metallic substrate.

In another preferred embodiment, graphene oxide is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid is used to cool down a metallic substrate.

For example, the metallic substrate is selected from among: aluminum, stainless steel, copper, iron, copper alloys, titanium, cobalt, metal composite, nickel.

The invention will now be explained in trials carried out for information only. They are not limiting.

EXAMPLES

Trials 1 and 2 were prepared by providing graphite electrode scrap from steelmaking plant. Trials 1 and 2 were respectively ground to have a size less than 150 μm and less than 450 μm.

After, Trials 1 and 2 were mixed with sodium nitrate and sulfuric acid. Potassium permanganate was slowly added into Trials 1 and 2. The mixture was kept at around 1° C. using a cooling system. Then, the cooling process was stopped and the mixtures were heated until reaching 35° C. to oxidize the graphite electrode scrap. After the oxidation, Trials 1 and 2 were gradually pumped into deionized water.

Then, the heat was removed and $H_2O_2$ in aqueous solution was added until there was no gas producing. $MnO_2$ was produced. HCl was added to the mixture to eliminate $MnO_2$.

Then, graphite oxide was washed and separated from the mixture by decantation. Then, it was exfoliated using ultrasound in order to obtain one or two layer(s) of graphene oxide.

Finally, graphene oxide of was separated from the mixture by centrifugation, washed with water and dried with air.

Trial 3 is the disclosed Example prepared according to the method of the Korean patent KR101109961.

Results are shown in the following Table 1:

| Method | Trial 1* | | Trial 2* | Trial 2 (KR101109961) | |
|---|---|---|---|---|---|
| Origin of raw material | Graphite electrode scrap from Steelmaking plant | | Graphite electrode scrap from Steelmaking plant | Kish graphite from Steel-mill byproduct | |
| Pre-treatment of raw material | Grinding step | Grinding to have a size less than 150 μm | Grinding to have a size less than 450 μm | Flushing step | Done with a solution of HCl and $HNO_3$ in water |
| | | | | Process of purification using a Pretreatment composition step | Done with a solution comprising EDTA salt, $Na_2SO_3$, surfactant, anionic and nonionic polymer dispersant and distilled water |
| | | | | Mechanical separation step | Done, Kish graphite having a size below or equal to 40 mesh, i.e. 420 μm, kept |
| | Pre-treatment time | 60 minutes | 60 minutes | Pre-treatment time | >24 hours |
| | Pre-treated raw material purity | >99% | >99% | | At least 90% |
| Oxidation step | preparation of the mixture | Done with $H_2SO_4$ and $NaNO_3$ | Done with $H_2SO_4$ and $NaNO_3$ | | Done with $H_2SO_4$ and $NaNO_3$ |
| | Addition of an oxidizing agent | $KMnO_4$ | $KMNO_4$ | | $KMnO_4$ |
| | Element to stop the reaction | Water followed by $H_2O_2$ | Water followed by $H_2O_2$ | | Water followed by $H_2O_2$ |
| | Exfoliation | Ultrasound | Ultrasound | | Ultrasound |
| | Oxidation time | 3 hours | 3 hours | | 30 minutes |

-continued

| Method | Trial 1* | Trial 2* | Trial 2 (KR101109961) |
|---|---|---|---|
| Product obtained | Graphene oxide comprising 48% of oxygen groups having an average Lateral size up to 10 μm with purity of 99.5% | Graphene oxide comprising 35% of oxygen groups having an average Lateral size up to 10 μm with purity of 99.5% | Graphene oxide having an average size between 12 and 20.5 μm and an average thickness between 5 and 120 nm |

*according to the present invention

The method of Trials 1 and 2 is more environmentally friendly than the method used for Trial 3. Moreover, the treatment of the raw material is performed very quickly compared to Trial 3. Finally, the graphene oxide obtained with Trials 1 and 2 has a high purity and quality.

What is claimed is:

1. A method for the manufacture of graphene oxide from graphite electrode scrap comprising:
   A. providing graphite electrode scrap used in electric arc furnaces;
   B. grinding of the electrode graphite scrap to obtain ground graphite electrode;
   C. oxidizing the ground graphite electrode to obtain graphene oxide including the following successive sub-steps:
      i. preparing a mixture including the ground graphite electrode, an acid and a nitrate salt, the mixture being kept at a temperature below 5° C.,
      ii. adding an oxidizing agent into the mixture obtained in step C.i) to obtain graphite oxide in an oxidation reaction,
      iii. after a targeted level of oxidation of at least 45% by weight of oxygen functional groups is reached, adding a chemical element to stop the oxidation reaction,
      iv. separating the graphite oxide from the mixture obtained in step C.iii),
      v. exfoliating the graphite oxide into graphene oxide.

2. The method as recited in claim 1 wherein in step B) the ground graphite electrode has a size less than 200 μm.

3. The method as recited in claim 2 wherein in step B) the ground graphite electrode has a size less than 150 μm.

4. The method as recited in claim 3 wherein in step B) the ground graphite electrode has a size between 100 and 150 μm.

5. The method as recited in claim 2 wherein in step C.i) the salt nitrate is chosen from at least one of the group consisting of: $NaNO_3$, $NH_4NO_3$, $KNO_3$, $Ni(NO_3)_2$, $Cu(NO_3)_2$, $Zn(NO_3)_2$, $Al(NO_3)_3$ and a mixture thereof.

6. The method as recited in claim 2 wherein in step C.i) the acid is chosen from at least one of the group consisting of: $H_2SO_4$, HCl, $HNO_3$, $H_3PO_4$, $C_2H_2Cl_2O_2$ (dichloroacetic acid), and a mixture thereof.

7. The method as recited in claim 2 wherein in step C.ii) the oxidizing agent is chosen from at least one of the group consisting of: potassium permanganate, $H_2O_2$, $O_3$, $H_2S_2O_8$, $H_2SO_5$, $KNO_3$, NaClO or a mixture thereof.

8. The method as recited in claim 2 wherein in step C.iii) the chemical element used to stop the oxidation reaction is chosen from at least one of the group consisting of: an acid, non-deionized water, deionized water, $H_2O_2$ or a mixture thereof.

9. The method as recited in claim 2 wherein a further chemical element is also chosen to stop the reaction, the chemical element and the further chemical element being used successively.

10. The method as recited in claim 2 wherein a further chemical element is also chosen to stop the reaction, the chemical element and the further chemical element being used simultaneously.

11. The method as recited in claim 2 wherein in step C.iii) the mixture obtained in step C.ii) is gradually pumped into the element used to stop the oxidation reaction.

12. The method as recited in claim 2 wherein in step C.iv) the graphite oxide is separated by centrifugation, decantation, distillation or filtration.

13. The method as recited in claim 2 wherein in step C.v) the exfoliation is performed by using ultrasound, mechanical agitator, sieve shaker or thermal exfoliation.

14. The method as recited in claim 2 wherein the graphene oxide has an average lateral size less than 10 μm.

15. The method as recited in claim 14 wherein the graphene oxide has purity of 99.5%.

* * * * *